Figure 4:
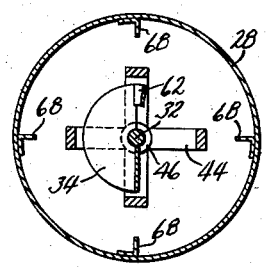

May 26, 1959
G. C. BAXTER ET AL
2,887,788
GRAIN DRYER
Filed Aug. 17, 1956
2 Sheets-Sheet 1
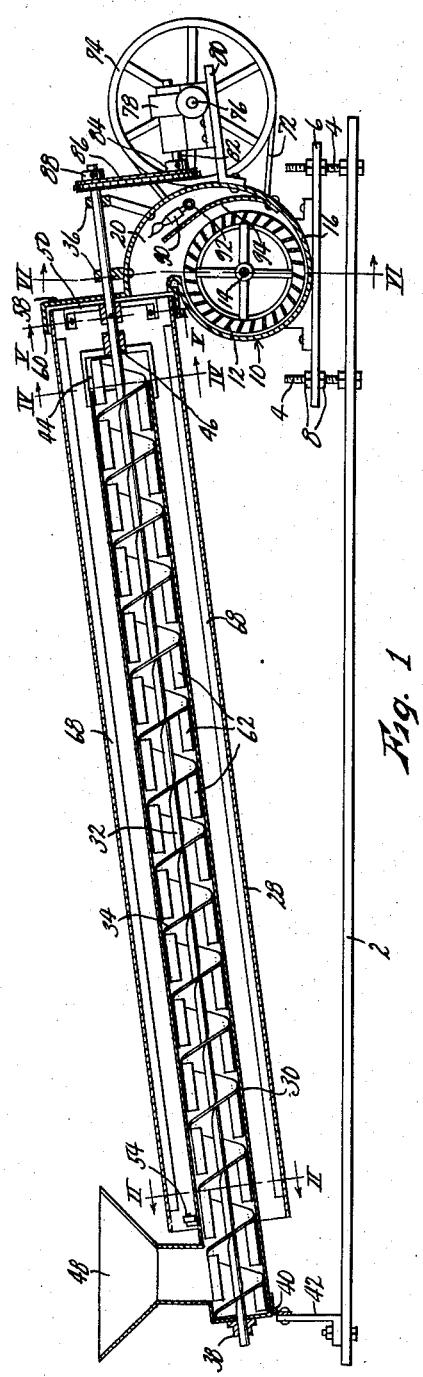
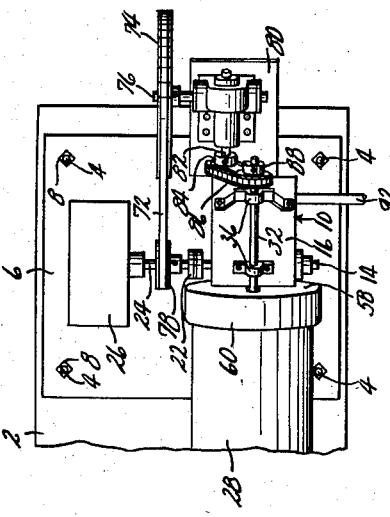
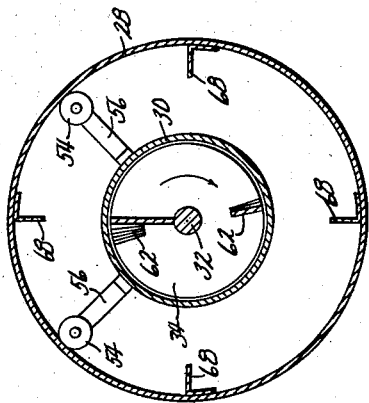
INVENTORS.
George C. Baxter
Lynn R. Christensen
BY
Hamilton & Hamilton
Attorneys.

INVENTORS.
George C. Baxter
Lynn R. Christensen
BY
Hamilton + Hamilton
Attorneys.

United States Patent Office 2,887,788
Patented May 26, 1959

2,887,788

GRAIN DRYER

George C. Baxter and Lynn R. Christensen, Marion, Kans.

Application August 17, 1956, Serial No. 604,717

1 Claim. (Cl. 34—128)

This invention relates to new and useful improvements in grain dryers, and relates more particularly to dryers of the class wherein the grain, or other material of a granular nature, is subjected to currents of heated air as it is conveyed through a housing of suitable structure.

The principal object of the present invention is the provision of a grain dryer of the class described having novel means for providing a long path for the grain in a relatively small and compact housing, thereby providing a valuable economy of space which is especially important where the dryer is to be mounted directly on a grain harvesting combine.

Another object is the provision, in a grain dryer of the class described, of novel means for agitating the grain to provide a thorough contact thereof with the heated air, and for preventing the dryer from being fouled or jammed by the straw, grass and weeds which may be introduced therein along with the grain.

Other objects are simplicity and economy of construction, efficiency and dependability of operation, and the provision of novel means for adjusting the grain capacity of the dryer.

Figure 5:
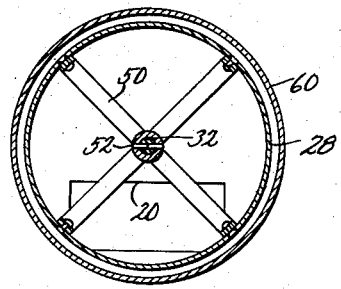
Figure 6:
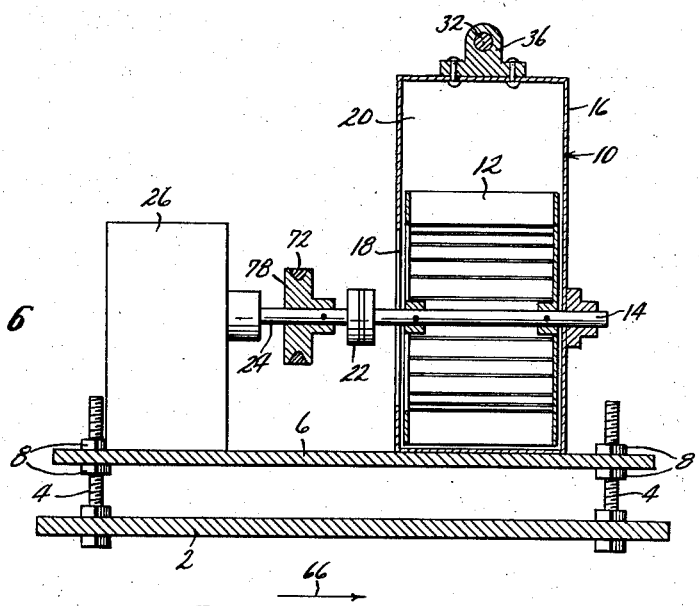
Figure 7:
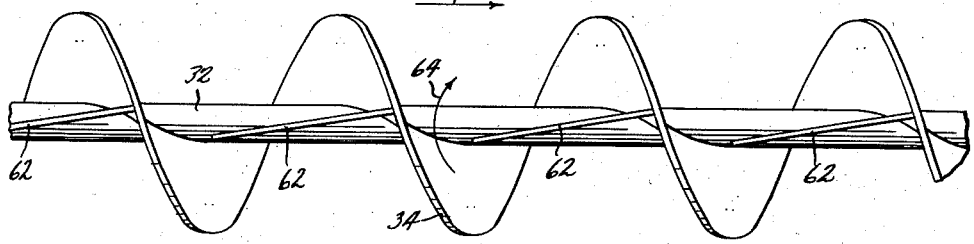

With these objects in view, as well as other objects which will appear in the course of the specification, reference will be had to the drawing, wherein:

Fig. 1 is a longitudinal vertical mid-sectional view of a grain dryer embodying the present invention, with parts left in elevation, Fig. 2 is an enlarged sectional view taken on line II—II of Fig. 1, Fig. 3 is a fragmentary top plan view of the dryer, showing the right end portion thereof as viewed in Fig. 1, Figs. 4 and 5 are enlarged sectional views taken respectively on lines IV—IV and V—V of Fig. 1, Fig. 6 is an enlarged sectional view taken on line VI—VI of Fig. 1, and Fig. 7 is an enlarged side elevational view of a portion of the conveying auger.

Like reference numerals apply to similar parts throughout the several views, and the numeral 2 applies to a planar base made of wood or other suitable material. It will be understood that this base either may be a part of the dryer, or may be a portion of the structure, such as a harvesting combine, to which the dryer is to be mounted. Adjacent the right end of the base, as viewed in Fig. 1, a plurality of upwardly extending bolts 4 are fixed therein, and extend through a platform 6 disposed above the base, said platform being supported by a pair of nuts 8 threaded on each of said bolts respectively above and below the platform. By adjusting said nuts, it will be seen that platform 6 may be raised or lowered, and to a degree tilted, with respect to the base, for a purpose to be fully described below.

Mounted on platform 6 is a blower 10 having a rotor 12 fixed on a rotatable shaft 14, said rotor being disposed in a housing 16 which has an axial air inlet 18 (Fig. 6), and an air outlet passage 20 extending longitudinally of the base. Blower shaft 14 is connected by coupling 22 with the drive shaft 24 of an internal combustion engine 26 or other suitable power unit which is mounted on platform 6. It will be understood that said engine or power unit is provided with a throttle or other means by which the speed thereof may be varied.

The actual drying unit comprises an outer cylinder 28, a smaller coaxial inner cylinder 30, and a shaft 32 extending axially through said inner cylinder and having affixed thereto a helical auger member 34 which is adapted to convey grain through said inner cylinder when the cylinder and auger are relatively turned. Shaft 32 is supported rotatably adjacent one end in a pair of bearings 36 mounted on blower housing 16, and at its opposite end in a bearing 38 mounted on the closed outer end of inner cylinder 30. Cylinder 30 is non-rotating, the outer end thereof being pivoted by hinge 40 to an upstanding post 42 affixed to base 2, whereby said cylinder may be tilted. The opposite end of said cylinder is open, and is connected by an open spider 44 to a bearing 46 in which shaft 32 is journalled. Cylinder 30 is provided adjacent its outer end with a hopper 48 by means of which grain may be introduced therein. Outer cylinder 28 is open at both ends and is rotatable, being supported at its blower end by a spider 50 fixed on shaft 32 by pin 52 (Fig. 5), and at its outer end by a pair of rollers 54 carried rotatably at the outer ends of a pair of arms 56 which are affixed at their inner ends to cylinder 30. The blower end of cylinder 28 is covered by an end plate 58 integral with the blower housing, said end plate being provided with a circular flange 60 which is concentric with and encircles the end portion of cylinder 28. The spacing between the flange and cylinder should be as close as practical, in order to inhibit the escape of air. The outlet passage 20 of the blower housing interconnects with the interior of the cylinders through end plate 58.

Auger 34 has attached thereto at angularly spaced intervals a series of agitators 62 each having the form of a bar attached at one end to a convolution of the auger at its outer edge, and extending generally parallel to shaft 32. Its opposite end is free, terminating short of the next convolution of the auger. It will be seen also in Fig. 7 that each agitator is inclined angularly to the shaft, from its point of attachment, in a direction opposite to the direction of rotation of said shaft, as indicated by arrow 64. The direction of travel of the grain is indicated by arrow 66. Agitators 68 are also provided in outer cylinder 28, said agitators comprising a plurality of angle-irons fixed to the inner surface of said cylinder so as to extend longitudinally thereof, and having one leg thereof extending radially inwardly to form a fin.

Drive shaft 24 of engine 26 has mounted thereon a pulley 70 operably connected by belt 72 with a larger pulley 74 mounted on the input shaft 76 of a speed reduction unit 78 which is mounted on a shelf 80 affixed to the blower housing. The output shaft 82 of said speed reducer has affixed thereon a sprocket 84 which is operably connect by an endless chain 86 to a sprocket 88 fixed on the extended end of shaft 32.

Within the outlet passage 20 of blower housing 16 are mounted one or more gas burners 90 which are supplied with fuel through a pipe 92 which extends outwardly from said housing and is connected to a suitable source of fuel gas, not shown. Said burners heat the air delivered by the blower, but are protected against direct air currents by a suitable baffle 94 in the housing.

It will be seen that the blower end of the cylinder assembly is disposed higher then the opposite end. Therefore grain fed into the lower end of cylinder 30 through hopper 48 is conveyed upwardly through said cylinder by rotating auger 34. At the same time, the grain is continuously raised and dropped by the agitators 62, so as to subject it to thorough and intimate contact with the heated air from the blower. The auger should not be loaded with grain to such an extent as to block the free passage of air therethrough. The air simply passes out through the hopper at the lower end of the cylinder. The air current is not sufficiently strong to blow the grain toward the lower end of the cylinder, or upwardly from the hopper.

It will be seen that the special formation of agitators 62 prevents the accumulation of straw, grass, weeds or the like thereon, and thereby prevents clogging and jamming of the parts. Due to the rearward inclination of said agitator bars, relative to the direction of rotation, any straw or the like catching thereon tends to work rearwardly therealong toward the free ends thereof, where the straw drops free of the agitators. Eventually, the straw of course leaves the dryer with the grain, and is separated therefrom in a later operation.

At the upper end of cylinder 30, auger 34 extends outwardly from said cylinder, and therefore drops the grain into outer cylinder 28, which of course rotates with the auger. The grain then passes gradually through cylinder 28 by gravity, due to the slope thereof, and is stirred in a lifting and dropping operation by angle-iron agitators 68 to promote thorough contact thereof with the heated air forced through the cylinder by the blower. Grain discharged from the lower end of cylinder 28 may be conveyed to any suitable container by means not shown, or may be fed into another dryer similar to that shown if further drying is required.

The rates of delivery of grain through outer cylinder 28 may be regulated by tilting said cylinder by means of bolts 4, thereby pivoting the cylinders about hinge 40. Platform 6 must of course also tilt, and bolts 4 engage the platform sufficiently loosely to permit said platform to tilt as much as required. Tilting of the inner cylinder 30 does not affect the rate of delivery of grain therethrough, since the auger constitutes a positive conveying means operable at any degree of tilt. However, the capacity of the inner cylinder may be adjusted to correspond to that of the outer cylinder by adjusting the speed of engine 26.

Hence it will be apparent that a grain dryer having several advantages has been produced. The reversal of direction of the grain in the cylinders, with the result that the path of the grain in the drying air is actually double the length of the cylinders, constitutes the machine very compact and economical in space in comparison to its capacity. The rate of grain travel may be easily adjusted to correspond to the amount of moisture it may be desired to remove from the grain. The apparatus will not be fouled by straw, grass or the like, and is very simple and economical in construction.

While we have shown and described a specific embodiment of our invention, it will be readily apparent that many minor changes of structure and operation could be made without departing from the spirit of the invention as defined by the scope of the appended claim.

What we claim as new and desire to protect by Letters Patent is:

A grain dryer comprising a base, a rotatable outer cylinder carried by said base in a tilted position and open at both ends, a non-rotating inner cylinder disposed concentrically within said outer cylinder and being substantially open at both ends, and adapted to receive grain to be dried in the lower end portion thereof, an auger disposed axially within said inner cylinder and operable to elevate grain through said inner cylinder when rotated, power means carried by said base and operable to rotate said auger and said outer cylinder, means carried by said base and operable to force a current of heated air through both of said cylinders, and agitator members affixed at intervals to said auger and operable to elevate and drop grain within said inner cylinder as said auger is rotated, said agitator members each comprising a bar affixed at one end to a convolution of said auger and extending generally parallel to the axis of said auger, said bar having its opposite end spaced apart from the adjacent convolution of the auger, and being inclined from its point of attachment in a direction opposite to the rotation of said auger.

References Cited in the file of this patent

UNITED STATES PATENTS

| | | |
|---|---|---|
| 337,560 | Cook | Mar. 9, 1886 |
| 1,965,881 | Clark et al. | July 10, 1934 |
| 2,392,189 | Riddell | Jan. 1, 1946 |
| 2,531,578 | McIlvaine | Nov. 28, 1950 |

FOREIGN PATENTS

| | | |
|---|---|---|
| 558,546 | Germany | Sept. 8, 1932 |
| 2,319,673 | France | May 18, 1943 |